(12) United States Patent
Frisch et al.

(10) Patent No.: US 6,173,744 B1
(45) Date of Patent: Jan. 16, 2001

(54) PIEZOELECTRIC VALVE

(75) Inventors: Herbert Frisch, Schelmenstrasse (AU); Hannes Wirtl, Colmarerstrasse; Günther Strasser, Rottenbuch, both of (DE)

(73) Assignee: Hygrama AG (CH)

(*) Notice: Under 35 U.S.C. 154(b), the term of this patent shall be extended for 0 days.

(21) Appl. No.: 09/271,381

(22) Filed: Mar. 18, 1999

(30) Foreign Application Priority Data

Mar. 18, 1998 (AT) .................................................. A 474/98

(51) Int. Cl.[7] .......................... F15B 13/044; F16K 31/02
(52) U.S. Cl. .................. 137/625.65; 137/625.44; 251/129.06
(58) Field of Search ................. 137/625.44, 625.65; 251/129.06

(56) References Cited

U.S. PATENT DOCUMENTS 4,340,083 * 7/1982 Cummins ................... 251/129.06 X
4,492,360 * 1/1985 Lee, II et al. ................... 251/129.06
4,765,370 * 8/1988 Ariizumi et al. ............ 137/625.44 X

FOREIGN PATENT DOCUMENTS

2134223 * 8/1984 (GB) ................................ 251/129.06

* cited by examiner

*Primary Examiner*—Gerald A. Michalsky
(74) *Attorney, Agent, or Firm*—Dykema Gossett PLLC

(57) ABSTRACT

A piezoelectric bending element is sealingly insertable into a chamber in a housing and controls with its free end at least one sealing seat corresponding to an applied control current. The bending element has a covering made of partially elastic insulating material and which also seals off the chamber at the proximal end. The bending element is electrically insulated and sealed off against the medium to be controlled, and electrical contacts lie outside of the working area of the valve.

15 Claims, 2 Drawing Sheets

PIEZOELECTRIC VALVE

BACKGROUND OF THE INVENTION

The invention relates to a piezoelectric valve with a one piece housing and a controllable sealing seat arranged within an elongated cavity in the housing. In particular, the valve employs an elongated piezoelectric bending element sealed off from and pushed into and held within the housing. The free end of the bending element closes or opens a sealing seat in accordance with an applied control current.

A piezo-ceramic bending converter is shown in EP-A1 0 191 011, in which the bending element is built into the housing in such a way that, at one end, it is supported at three points, of which one is adjustable and serves, at the same time, for contacting the middle electrode. The bending element is tightly connected and uses a separate guide spring which is connected to the housing and presses the bending element against the points of support. Using the free end of the bending element, an exhaust or intake air nozzle can be alternately closed or opened. The electric contacts for the piezoelectric bending element are brought out of the housing and sealed off.

The electrodes of the bending element and the contact pieces in the interior of the housing are not protected or insulated but are directly exposed to the streaming medium. As a result operation of the known arrangement with electrically conducting liquids is not possible. When a condensate forms, there is the danger of an electric short in the interior of the housing, and danger of corrosion at the points of contact. Since the points of contact are located in the interior of the housing, and are not separated from the work area, the electric contact points must be lead out of the housing in a gas-tight manner. The sealing-off between the bending element and the openings or nozzles to be controlled requires high-quality surfaces and exact interpositioning, in order to achieve the lowest possible leakage values. The described conditions result in a relatively elaborate and costly manufacturing process as well as the additional disadvantage that the housing assembly is glued together and can only open by damaging it. Accordingly, the relatively expensive bending elements cannot be removed and reused after installation and adjustment.

A bending converter constructed as described above is shown in DE 44 10 153 C1, which suggests attaching an insulating cover layer onto the bending element. While this allows for the control of aggressive or electrically conducting liquids, the other described disadvantages remain.

Finally, WO 97/09555 shows a piezoelectric valve with a one piece housing having an lateral opening for receiving the bending element, which is cast permanently together with a casting material. Although the interior of the housing is sealed off, the device may not be dismantled without damaging or destroying the bending element. Furthermore, it is not insulated and thus has limited applications.

SUMMARY OF THE INVENTION

It is an object of the present invention to improve on a piezoelectric valve for control of various media, such that, the described disadvantages can be avoided in a simple and inexpensive manner. It is also an object to provide a piezoelectric valve which, in the case of installation or adjustment errors, the entire valve can be taken apart without damaging the bending element and in which single parts thereof can be used again.

The problem is solved by a piezoelectric valve in which the piezoelectric bending element employs a partially elastic insulating cover for sealing off the interior of the housing. The insulation covering need not be glued or permanently sealed so that the bending element can be withdrawn from the housing without damage after installation and adjustment, and be easily used again.

In an exemplary embodiment, the housing has an elongated opening and the bending element is slidably locatable therein. The bending element has a covering formed of a one piece element sleeved over the bending element, and has a sealing bulge or flange extending transverse with respect to the longitudinal direction of the bending element. A terminal shoe is secured on the proximal end of the bending element which, when installed in the housing, clamps the flange between an application surface of the housing and an abutting surface of the terminal shoe. In this way, the covering is a simple construction and is effectively sealed by means of the sealing bulge, which provides the necessary outward sealing of the interior of the housing between the housing and the terminal shoe, while allowing non-destructive disassembly.

The terminal shoe, can also incorporate a portion of the electrical contacts of the bending element which, thus, upon insertion into the elongated opening in the housing is positioned properly for electrical connection.

According to another embodiment, a flexible latch is provided for the terminal shoe which snaps into a latch opening in the housing. The latch can be disengaged if necessary. Alternatively, the flexible latch can also be provided in the housing with a corresponding latch opening in the terminal shoe. The arrangement greatly facilitates the assembly, installation and dismantling of the valve, in particular, the relative position of the various installed elements with respect to one another.

The covering, according to an exemplary embodiment of the invention, comprises a thinly walled elastomer which is reinforced in the area of the sealing bulge and/or the sealing seat. By means, of the thinness of the walls, the effects from the longitudinal thermal expansion and swelling can be minimized. This is particularly useful in the area of the nozzles where it is advantageous that mechanical freedom of movement of the bending element is only nominally impaired.

According to a further advantageous embodiment of the invention, the length of the covering prior to installation is slightly smaller than the length of bending element in the non-installed state. Upon installation, the covering stretches to better position and secure the covering onto the bending element.

According to another embodiment of the invention, the interior of the covering, is de-aerated or vented into the environment via surface roughness of the bending element and/or via additional grooves, notches, canals or the like formed in the bending element and the terminal shoe. As a result, the covering is pressed against the surface of the bending element depending on the operational pressure, and lifting off or separation of the covering from the bending element, especially in the area of the nozzles, can be prevented.

BRIEF DESCRIPTION OF THE DRAWINGS

The invention is described further in reference to partially schematically illustrated examples of embodiments in the drawing.

DESCRIPTION OF THE INVENTION

Figure 1:
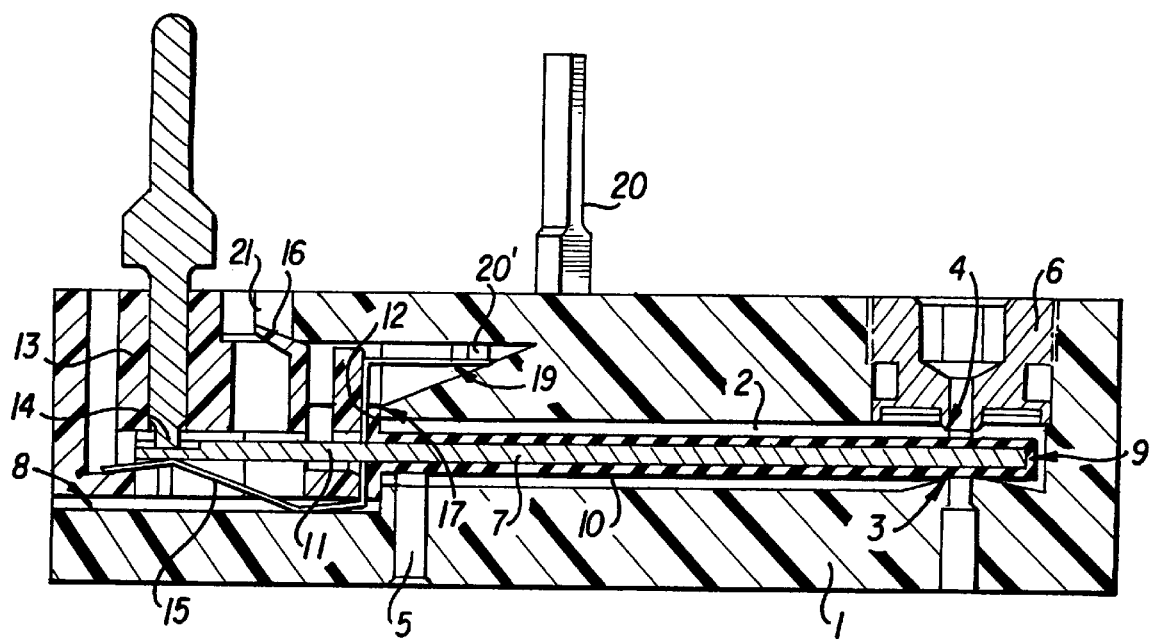
FIG. 1 shows a cross-section of a piezoelectric valve arranged according to the invention.

The piezoelectric valve according to the invention and illustrated in FIG. 1 has a one piece housing 1 having an elongated interior chamber 2. The valve functions as an electric-pneumatic bending converter and carries two controllable sealing seats or nozzles 3, 4 arranged opposite one another in the chamber 2. The sealing seat 3 controls fresh air. The sealing seat 4, arranged as a screw part 6, is adjustable and controls the exhaust air. Signal exit 5 communicates with the chamber 2.

As shown to the left in FIG. 1, an elongated piezoelectric bending element 7 is inserted into a lateral opening 8 in the housing 1 (see also FIG. 3) which is in communication with the chamber 2. The bending element 7 is held on one side therein. The free end 9 of the bending element 7 is movable between the sealing seats 3, 4 which movement is achieved in accordance with a corresponding applied control current with which the sealing seats are closed or opened. As a result, the signal exit 5 is selectively in communication with either the fresh air or the exhaust air. The illustrated valve, thus, can be used, for example, as a pre-control valve.

The piezoelectric bending element 7, has a covering 10 made of at least partially elastic insulating material. The covering 10 is sleeved over distal end 9 of the bending element 7. The covering 10 extends to near the proximal end 11 of the bending element 7 and is adapted to simultaneously seal off the interior 2 of the housing 1. In addition, the covering 10 is a one-piece element formed with sealing bulge or flange 12 formed on the proximal end 11 (also see FIG. 2) which extends transverse with respect to the longitudinal direction of the bending element 7. A terminal shoe 13 is mounted to the proximal end 12 of the bending element 7 which together with covering 10 and terminal shoe 13 may be manually inserted into the housing 1 as shown in FIGS. 1 and 3. The terminal shoe 13 has an adjustable contact peg 14 and a contact spring 15 shown in exploded perspective in FIG. 2.

The housing 1 has a latch opening 21. The terminal shoe 13 carries a flexible latch 16 which engages the latch opening 21 when inserted from the left into the opening 8 of the housing 1. The latch 16 snaps into the latch opening 2 of the housing 1 and may be removed if necessary in such a way that, the terminal shoe 13 and the bending element 7 may be withdrawn from the housing 10 without damage. The flange 12 is clamped between the housing 1 and the terminal shoe 13. The terminal shoe engages the contact spring 15 and compresses the sealing flange 12 against an application surface 17 of the housing 1, such that the interior 2 of the housing is securely sealed off.

The contact spring 15 engages the lower side of the bending element 7 below and opposite to where the contact peg 14 engages the bending element 7 from above. The housing 1 is equipped with a second contact peg 20 and inner extension 20'. When inserted in the housing 1, the other end 19 of the contact spring 15 makes contact with the second contact peg 20 via the inner extension 20'.

Figure 2:
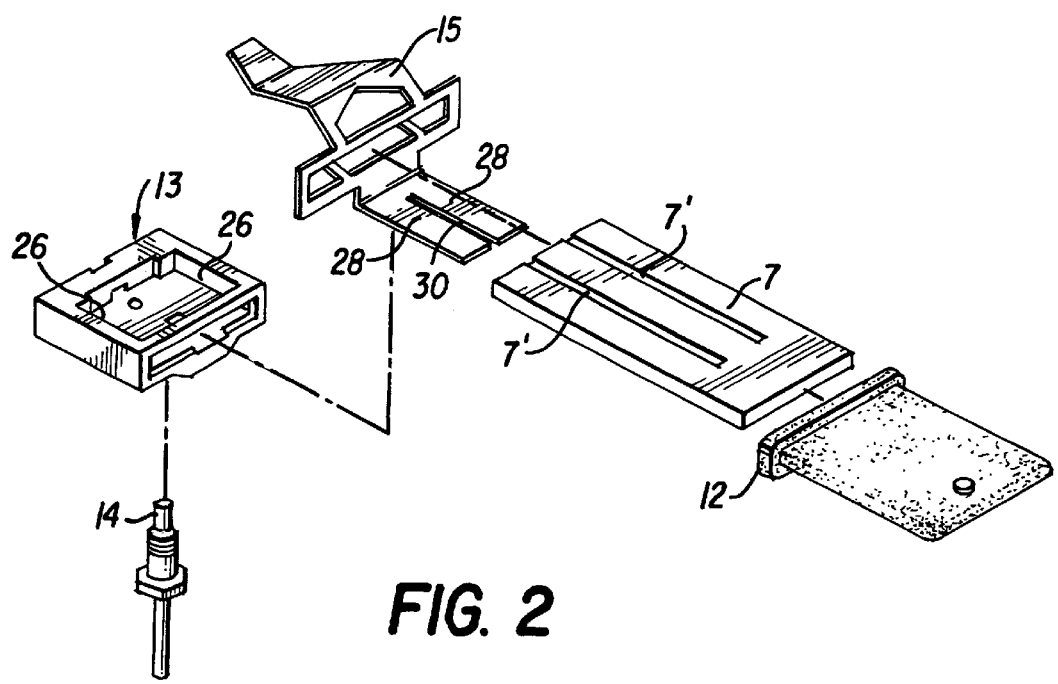
FIGS. 2 and 3 show a perspective exploded diagram of two partial steps in the installation of valve according to FIG. 1.
Figure 3:
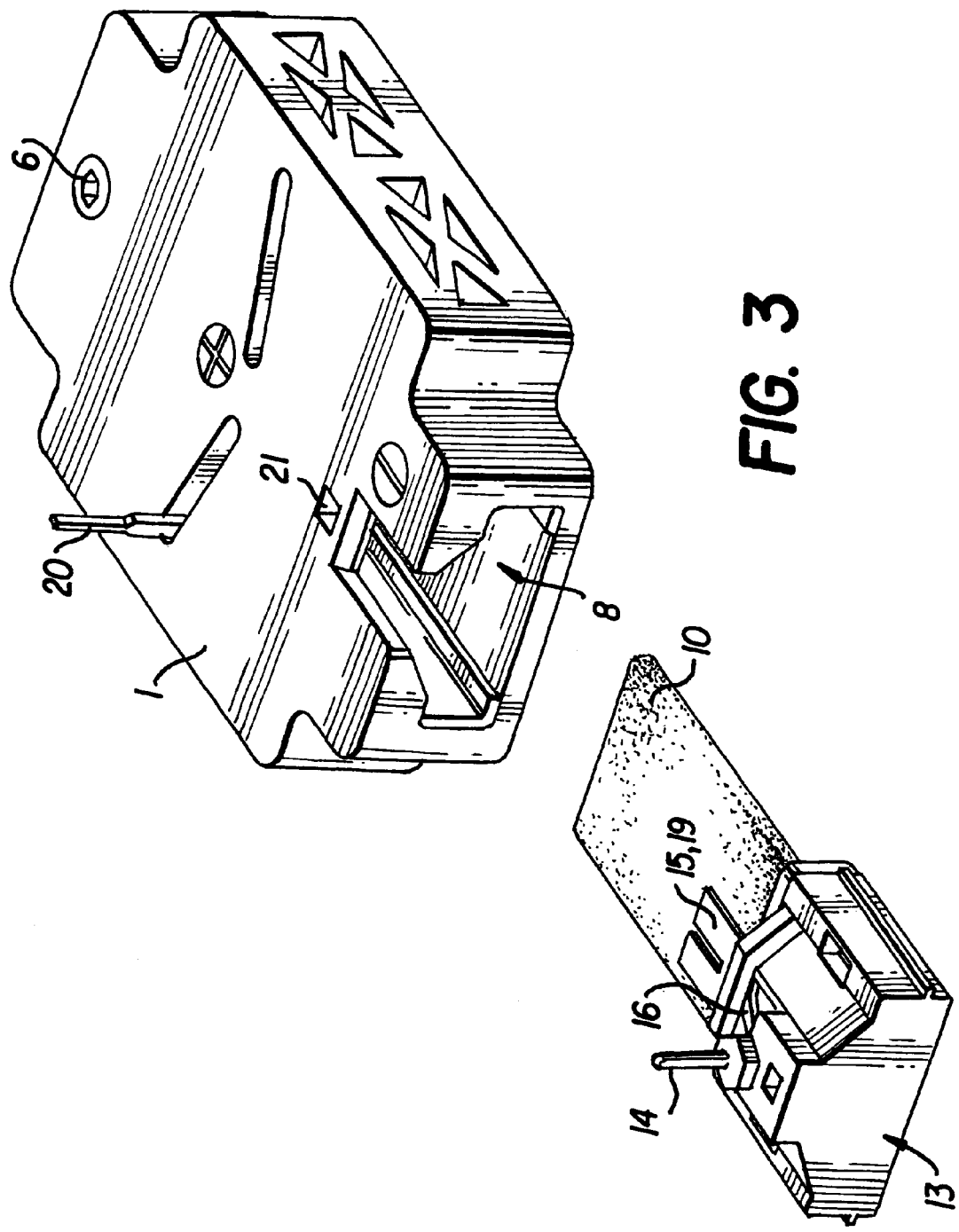

The covering 10 has relatively thin walls and may be reinforced in the area of the sealing bulge 12 in the area of the sealing seats 3 and 4 as shown in FIG. 2. The elastomer forming the covering 10 is electrically insulating and has selectable properties (for example, stability of the chemicals, or the like). The relaxed length of the covering 10 prior to installation is slightly smaller than the length of the bending element subsequent to installation. The covering 10 when installed becomes slightly stretched between the sealing bulge 12 and the free end 9. Thus, the covering 10 becomes situated securely on the bending element 7.

The interior of the covering 10 can be de-aerated or vented into the environment via surface roughness of the bending element 7 or via additional canals' or the like which extend through the terminal shoe 13. Applied operational pressure results in an active pressing of the covering 10 against the surface of the bending element 7 and, in so doing, allows for an improved placement.

The walls of the covering 10 are sufficiently thin so as to avoid or minimize the negative effects of thermal expansion, mainly in the area of the sealing seats 3, 4. Additionally, the mechanical freedom of movement of the bending element 7 is relatively unaffected or impeded by the covering 10. The elasticity of the covering improves effectiveness of the sealing seats 3, 4, and at the same time, reduces requirements with regard to geometry and surface quality of the sealing seats 3 and 4.

The bending element 7 shown in FIG. 2, is inserted into the terminal shoe 13 together with the contact spring 15 and is held tightly at a number of points of application. One point of application is formed by the contact peg 14 which is adjustable and simultaneously serves as an electrode for connection to an intermediate portion of the bending element 7. The terminal shoe 13 has lateral centralizing surfaces 26 which laterally fix the bending element 7. The contact spring 15 presses against the points of application and establishes electrical contact with the outer electrodes. The contact spring 15 surrounds the bending element 7 in the area of the sealing bulge 12 and contacts the surface of both sides with spring-laden flaps 28 (see FIG. 2). These flaps are formed such that the bending element 7 can, as a practical matter, only be inserted and, in the case of an attempt to pull it out of the contact spring, is irreversibly blocked. In this way, the bending element 7 is longitudinally fixed after the installation by snapping into the terminal shoe 13. The spring may be formed with a longitudinal slit 30.

In the installation of the terminal shoe 13 by means of lateral insertion into the housing 1 (see FIGS. 1 and 3), the contact spring 12 is pre-stressed in the housing 1. Furthermore, in so doing, the surrounding sealing bulge 12 is pressed and deformed against the surface 17 of the housing 1, and the latch 16 snaps into the latch opening 21. The pressing and deformation of the sealing bulge 12 produces a counter-force which urges the latch 16 into engagement with upstanding wall against the left in the housing opening 21, with which an exact position of the bending element, even in the installed state, is ensured.

The electric contact points of the bending element 7 are arranged on the side of the terminal shoe outside of the interior 2 of the housing 1 and are, thus, separated from the work area where the valve filled with the medium to be controlled is to be used. This feature is advantageous with regard to corrosion.

The entire valve can be dismantled at any time without damage because of the complete absence of glued, soldered or other permanent attachments or the like. The lattch 16, according to FIG. 1, may be released by means of pushing it down, after which the terminal shoe 13 with the bending element 7, the covering 10, the contact peg 14 and the contact spring 15 may be pulled back out of the housing 1.

The housing 1 can, for example, be manufactured using plastic injection molding technology which simplifies and reduces the price of the manufacturing of the valve. The terminal shoe can likewise be formed of plastic and be manufactured using injection molding technology which allows for the manufacturing of simple and low cost valves of the type described.

What is claimed is:

1. A piezoelectric valve comprising a housing formed with an internal chamber having a proximal end and a distal end, at least one controllable sealing seat located near the distal end of the interior chamber and a piezoelectric bending element slidably located in a lateral opening in the housing, thereby being inserted into said internal chamber and having a proximal end outside of the internal chamber and a distal portion located within the chamber sealed off from the proximal end of the housing, the free end of the bending element engaging the sealing seat for selectively opening and closing said sealing seat in response to an applied control current, wherein the piezoelectric bending element has sleeved over its distal end, a covering formed of partially elastic insulating material said covering sealingly engaging the housing at the position of its lateral opening.

2. A valve according to claim 1, wherein the covering includes a sealing bulge extending transversely of the bending element near the proximal end.

3. A valve according to claim 2 including a terminal shoe secured to the proximal end of the bending element for lockably engaging the bulge between the housing and said terminal shoe.

4. A valve according to claim 3 including a latch for securing the terminal shoe to the housing.

5. A valve according to claim 4 wherein the latch comprises a flexible member secured to the terminal shoe and the housing has a latch opening for receiving the latch.

6. A valve according to claim 2 wherein the bending element has a relaxed length smaller than the length of bending element when the bending element is in the non-installed state said covering being lengthened when installed.

7. A valve according to claim 2 wherein bending element has a surface roughness and, the covering has an interior portion for receiving the bending element therein, said covering being vented into the environment via the surface roughness of the bending element.

8. A valve according to claim 7 further including at least one of grooves, notches and canals extending between the bending element through the terminal shoe.

9. A valve according to claim 2 wherein the covering has an interior and the bending element has at least one of surface roughness, longitudinal grooves, notches and canals for venting the interior of the chamber.

10. A valve according to claim 9 wherein the terminal has an aperture in communication with the interior of the covering.

11. A valve according to claim 2 further including a spring element extending between an intermediate portion of the flexible member and the terminal shoe.

12. A valve according to claim 1 further including a terminal secured to the terminal shoe and electrically contacting the spring element.

13. A valve according to claim 1 wherein the covering comprises an elastomer having relatively thin walls and reinforcement in at least one of the sealing bulge and the sealing seat.

14. A valve according to claim 1 wherein the sealing seat includes openings disposed in opposition across the chamber.

15. A valve according to claim 1 further including a signal exit opening in communication with the chamber.

* * * * *